United States Patent
Kwon

(10) Patent No.: US 8,307,394 B2
(45) Date of Patent: Nov. 6, 2012

(54) IMAGE PROCESSING APPARATUS AND METHOD IN DIGITAL BROADCASTING RECEIVER FOR ADJUSTING DIGITAL BROADCAST IMAGE IN RESPONSE TO CAPTION INFORMATION

(75) Inventor: Hung-Rok Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1181 days.

(21) Appl. No.: 11/446,165

(22) Filed: Jun. 5, 2006

(65) Prior Publication Data
US 2007/0022435 A1 Jan. 25, 2007

(30) Foreign Application Priority Data
Jul. 20, 2005 (KR) ........................ 10-2005-0065895

(51) Int. Cl.
*G06F 3/00* (2006.01)
*G06F 13/00* (2006.01)
*H04N 5/445* (2006.01)

(52) U.S. Cl. ............. 725/44; 725/39; 348/468; 348/589

(58) Field of Classification Search .............. 725/37–61; 715/243–253, 788–801; 345/660; 348/468, 348/584–591
See application file for complete search history.

(56) References Cited

U.S. PATENT DOCUMENTS 5,844,620 A * 12/1998 Coleman et al. ................ 725/54
5,850,218 A * 12/1998 LaJoie et al. .................... 725/45
6,002,797 A * 12/1999 Mori et al. ..................... 382/173
6,201,538 B1 * 3/2001 Wugofski ...................... 715/716
6,400,379 B1 * 6/2002 Johnson et al. ................ 715/721
2002/0075403 A1 * 6/2002 Barone et al. ................. 348/461

FOREIGN PATENT DOCUMENTS

JP 2002232802 A * 8/2002
KR 1997-0019457 4/1997

OTHER PUBLICATIONS

Korean Office Action for Korean Patent Application No. 2005-0065895, issued on Nov. 13, 2006.

* cited by examiner

*Primary Examiner* — Scott Beliveau
*Assistant Examiner* — Patrick A Ryan
(74) *Attorney, Agent, or Firm* — H.C. Park & Associates, PLC

(57) ABSTRACT

In an image processing apparatus and method, a digital broadcasting receiver enables electronic program guide (EPG) information data and digital broadcasting image data not to visually overlap each other when digital broadcasting image data of a channel, including caption information, is processed. The image processor of the digital broadcasting receiver determines whether a changed channel includes caption information, and when the changed channel includes the caption information, the image processor scales down the digital broadcasting image data received from a digital broadcasting server, displays the scaled down digital broadcasting image data on one side of a screen, and displays EPG information data on another side of the screen.

18 Claims, 3 Drawing Sheets

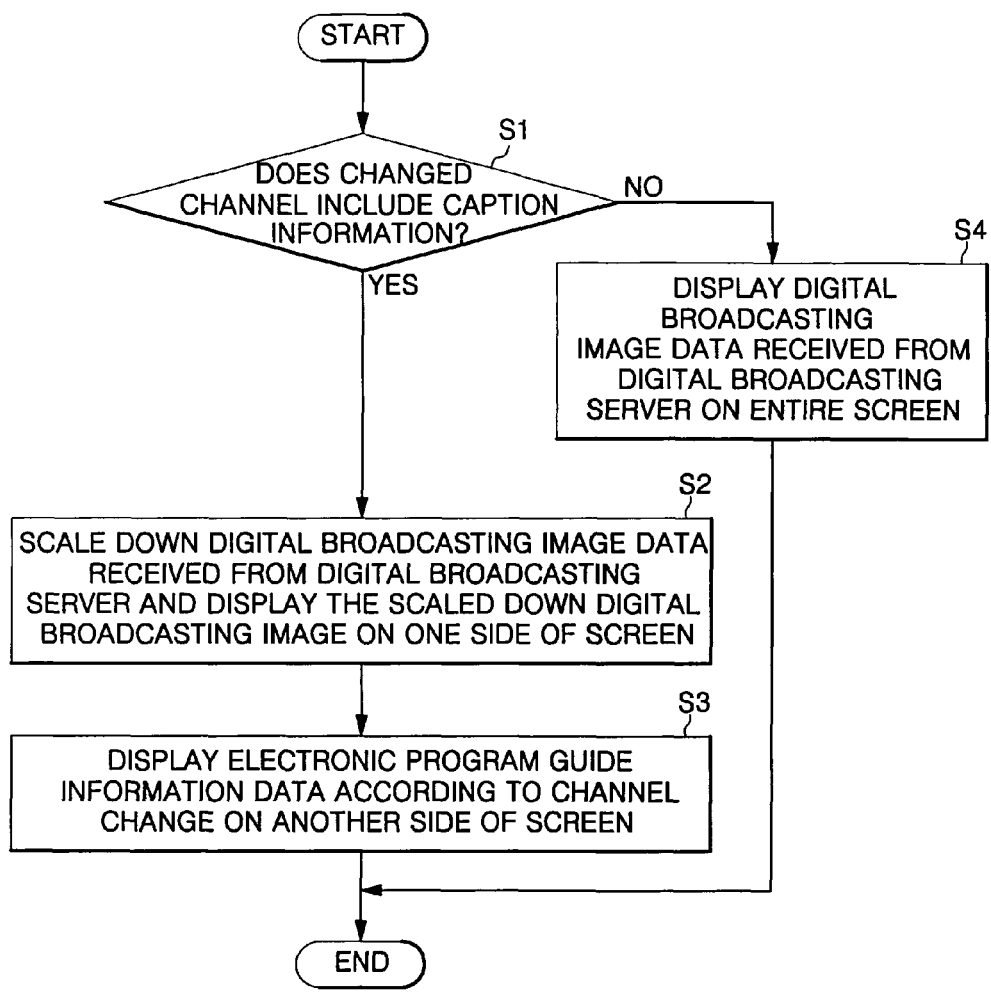

IMAGE PROCESSING APPARATUS AND METHOD IN DIGITAL BROADCASTING RECEIVER FOR ADJUSTING DIGITAL BROADCAST IMAGE IN RESPONSE TO CAPTION INFORMATION

CLAIM OF PRIORITY

This application makes reference to, incorporates the same herein, and claims all benefits accruing under 35 U.S.C. §119 from an application for APPARATUS AND METHOD FOR PROCESSING IMAGE IN DIGITAL BROADCAST SYSTEM filed in the Korean Intellectual Property Office on Jul. 20, 2005 and there duly assigned Ser. No. 10-2005-0065895.

BACKGROUND OF THE INVENTION

1. Technical Field

The present invention relates to an image processing apparatus and method in a digital broadcasting receiver.

2. Related Art

In general, digital broadcasting efficiently compresses programs according to each channel on the basis of a moving picture experts group (MPEG) coding standard, and multiplexes and transmits programs corresponding to a large number of channels on the basis of a digital modulation method of each transmission medium. Therefore, in contrast to analog broadcasting, digital broadcasting can broadcast several tens and several hundreds of channels without using a large number of repeaters. Due to these various advantages, digital broadcasting technology has been emphasized.

Such a digital broadcasting system comprises: a digital broadcasting server for supplying digital broadcast image data; a channel information server for supplying information for each channel through a cable modem termination system (CMTS); and a set-top box for displaying the digital broadcast image data received from the digital broadcasting server, and the channel information and electronic program guide (EPG) information received from the channel information server to a user through a digital television (TV).

When a channel is changed while watching the broadcast, the conventional digital broadcasting system displays and provides information relating to the changed channel.

Therefore, when a user changes a channel using a remote controller or a button placed on the TV while watching a digital broadcast, the set-top box displays the digital broadcast on a screen, and simultaneously displays the channel information on a small window.

However, in digital broadcasting including caption information, the EPG information data is simultaneously displayed with the digital broadcasting image data so that a visual collision occurs between the data. Therefore, it is difficult to provide the caption information to the user.

SUMMARY OF THE INVENTION

It is an object of the present invention to provide an image processing apparatus and method in a digital broadcasting receiver, wherein the apparatus and method scale down an image size of the digital broadcast, and thus prevent caption information and EPG information from colliding with each other when digital broadcasting images include caption information.

In accordance with one aspect of the present invention, an image processor in a digital broadcasting receiver comprises: a determiner for determining whether a changed channel includes caption information; and a sub-image processor which, when the determiner determines that the changed channel includes the caption information, scales down an image of data received from an image data supply server, displays the scaled down image on one side of a screen, and displays electronic program guide (EPG) information data on another side of the screen.

In accordance with another aspect of the present invention, an image processing method in a digital broadcasting receiver comprises the steps of: when a channel is changed, determining whether the changed channel includes caption information; when the changed channel includes caption information, scaling down digital broadcasting image data received from a digital broadcasting server, and displaying the scaled down digital broadcasting image data on one side of a screen; and displaying electronic program guide (EPG) information data according to the channel change on another side of the screen.

In accordance with another aspect of the present invention, a digital broadcasting receiver comprises an image processor which determines whether a changed channel includes caption information, and when the changed channel includes the caption information, scales down digital broadcasting image data received from a digital broadcasting server, displays the scaled down digital broadcasting image data on one side of a screen, and displays electronic program guide (EPG) information data on another side of the screen.

Preferably, the image processor includes a determiner for determining whether the changed channel includes the received caption information, and a sub-image processor which, when the channel is determined to include the caption information, scales down the data image received from an image data supply server, displays the scaled down image on one side of the screen, and displays the EPG information data on another side of the screen.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 4 is a flowchart of an image processing method of a digital broadcasting receiver according to the present invention.

DETAILED DESCRIPTION OF THE INVENTION

An embodiment of a set-top box of a digital broadcasting system according to the present invention will be described below in detail with reference to the appended drawings.

Figure 1:
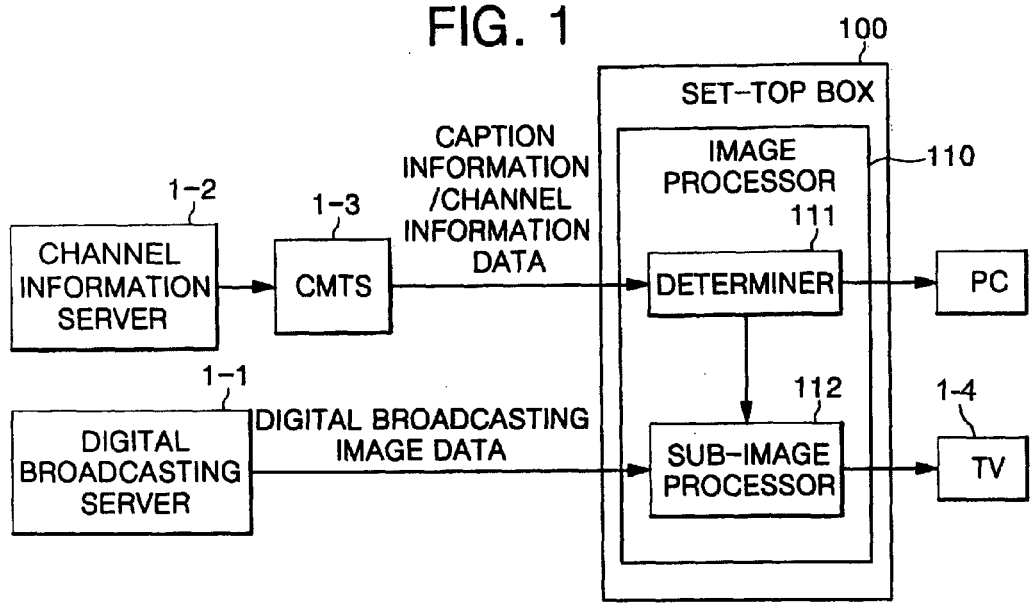
FIG. 1 is a functional block diagram of a digital broadcasting receiver according to the present invention.
Figure 2A:
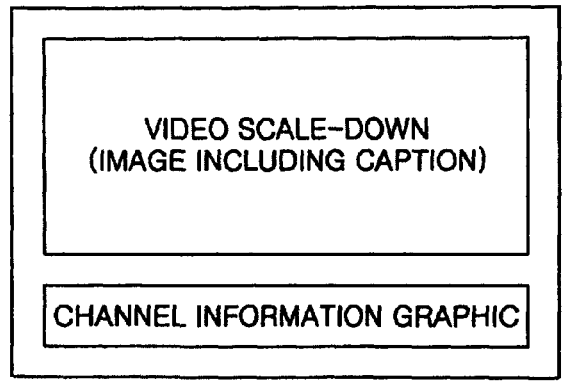
FIG. 2A illustrates an image of a channel, including caption information, which is processed by the digital broadcasting receiver shown in FIG. 1.
Figure 2B:
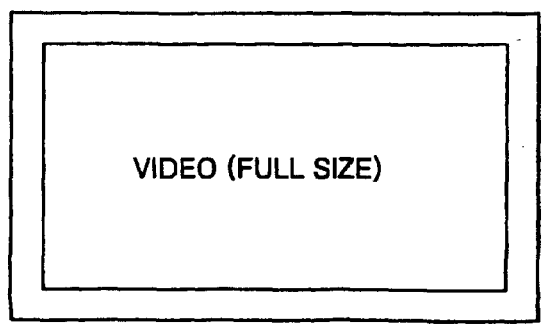
FIG. 2B illustrates an image of a channel, not including caption information, which is processed by the digital broadcasting receiver shown in FIG. 1.
Figure 2C:
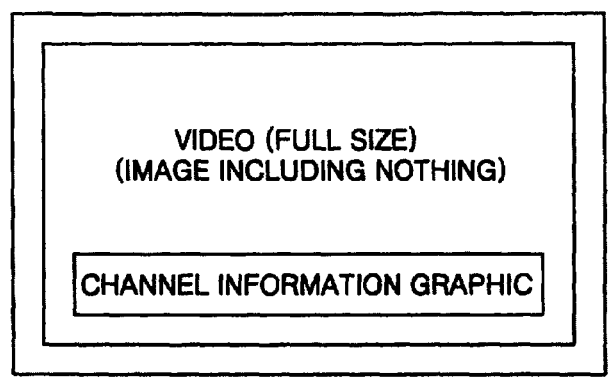
FIG. 2C illustrates an image of a channel which is processed by the digital broadcasting receiver shown in FIG. 1 after electronic program guide (EPG) information has been displayed.

FIG. 1 is a functional block diagram of a digital broadcasting receiver according to the present invention; FIG. 2A illustrates an image of a channel, including caption information, which is processed by the digital broadcasting receiver shown in FIG. 1; FIG. 2B illustrates an image of a channel, not including caption information, which is processed by the digital broadcasting receiver shown in FIG. 1; and FIG. 2C illustrates an image of a channel which is processed by the digital broadcasting receiver shown in FIG. 1 after electronic program guide (EPG) information has been displayed.

The digital broadcasting system comprises a digital broadcasting server 1-1, a channel information server 1-2, and a set-top box 100. The digital broadcasting server 1-1 supplies digital broadcasting image data to the set-top box 100, and the channel information server 1-2 supplies channel information, caption information, and electronic program guide (EPG) information to the set-top box 100 through a cable modem termination system (CMTS) 1-3. The set-top box 100 displays the digital broadcasting image data received from the digital broadcasting server 1-1 to a user through a digital television (TV) 1-4, and the channel information and EPG information received through the channel information server 1-2 to the user.

The system described below is only an example of the present invention, and thus those skilled in the art will appreciate that the present invention is not limited thereto.

The set-top box 100 of the digital broadcasting system according to the present invention includes an image processor 110 having a determiner 111 and a sub-image processor 112.

When a user changes a channel, the image processor 110 of the set-top box 100 determines whether the channel includes caption information. When the channel includes caption information, the image processor 110 scales down and displays the digital broadcasting image data received from the digital broadcasting server 1-1 on one side of a screen, and simultaneously displays the changed channel information received from the channel information server 1-2 on another side of the screen so as not to overlap the digital broadcasting image data as shown in FIG. 2A.

The determiner 111 of the image processor 110 determines whether the changed channel includes the received caption information. In this regard, the determiner 111 determines whether the channel includes the caption information received from the channel information server 1-2, and the caption information is as shown in Table 1.

TABLE 1

| Descriptor Name (caption information name) | |
| --- | --- |
| Descriptor tag (caption information tag) | 0xf1 |
| Descriptor length (caption information length) | 10 |
| Included flag | 1 |
| Start time (caption start time) | 19:30 |
| End time (caption end time) | 20:00 |

The caption information includes at least one of the caption information name, caption 9 information tag, caption information length, flag, caption start time, and caption end time.

When the determiner 111 determines that the channel includes the caption information, the sub-image processor 112 of the image processor 110 scales down and displays the digital broadcasting image data received from the digital broadcasting server 1-1 on one side 13 of the screen, and displays the EPG information data received from the channel information server 1-2 on another side of the screen as shown in FIG. 2A.

General functions and detailed operations of each composition mentioned above will be omitted, but operations corresponding to the present invention will be primarily described.

In the digital broadcasting system, the digital broadcasting server 1-1 generally supplies digital broadcasting image data to the set-top box 100.

The digital broadcasting system also includes the channel information server 1-2 which supplies information relative to each channel to the set-top box 100 through the CMTS 1-3. In this regard, the channel information server 1-2 sends EPG information data to the set-top box 100.

Therefore, when a user changes a digital broadcasting channel, the determiner 111 of the image processor 110 determines whether the changed channel includes caption information. Specifically, the determiner 111 determines whether the changed channel includes the caption information as shown in Table 1.

When the changed channel includes the caption information, the sub-image processor 112 of the image processor 110 scales down the digital broadcasting image data received from the digital broadcasting server 1-1, and displays the digital broadcasting image data on one side of the screen of the digital TV 1-4 as shown in FIG. 2A.

In addition, the sub-image processor 112 of the image processor 110 displays the EPG information data received from the channel information server 1-2 on another side of the screen of the digital TV 1-4 so as not to overlap the digital broadcasting image data.

Subsequently, after the EPG information has been displayed, the sub-image processor 112 of the image processor 110 displays the scaled down digital broadcasting image data on the entire screen as shown in FIG. 2B.

When the caption information is not included in the changed channel, the sub-image processor 112 of the image processor 100 displays the digital broadcasting image data received from the digital broadcasting server 1-1 on the entire screen, and simultaneously displays the EPG information data so as to overlap one side of the digital broadcasting image data, as shown in FIG. 2C.

Hereinafter, an exemplary embodiment of an image processor of the digital broadcasting system according to the present invention will be described in detail with reference to the appended drawings.

Figure 3:
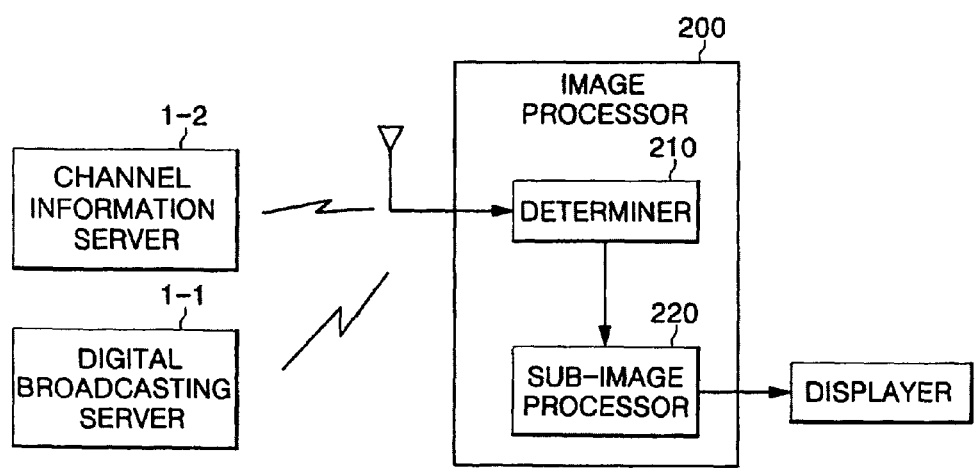
FIG. 3 is a functional block diagram of an image processor of a digital broadcasting system according to the present invention.

FIG. 3 is a functional block diagram of an image processor of the digital broadcasting system according to the present invention. The image processor 200 according to the present invention includes a determiner 210 and a sub-image processor 220.

The determiner 210 determines whether a changed channel includes caption information. In this regard, the determiner 210 receives caption information from a channel information server 1-2 and determines whether the caption information is included in the channel. The caption information is as shown in Table 1, and includes at least one of a caption information name, caption information tag, caption information length, flag, caption start time, and caption end time.

When the determiner 210 determines that the channel includes the caption information, the sub-image processor 220 scales down and displays digital broadcasting image data received from the digital broadcasting server 1-1 on one side of a screen, and displays EPG information data received from the channel information server 1-2 on another side of the screen.

Hereinafter, an image processing method in the above described construction will be described with reference to FIG. 4, which is a flowchart of an image processing method of a digital broadcasting receiver according to the present invention.

When a channel is changed by the user, a determination is made as to whether the changed channel includes caption information (S1). The caption information is as shown in Table 1, and includes at least one of a caption information name, caption information tag, caption information length, flag, caption start time, and caption end time.

When it is determined that the channel includes the caption information (YES) in step S1, the digital broadcasting image data received from the digital broadcasting server 1-1 is scaled down and displayed on one side of the screen (S2).

Subsequently, EPG information data according to the channel change is displayed on another side of the screen (S3).

Then, when the display of the EPG information has been finished, the scaled down digital broadcasting image data is displayed on the entire screen.

Conversely, when it is determined that the channel does not include the caption information (NO) in step S1, the digital broadcasting image data received from the digital broadcasting server 1-1 is displayed on the entire screen (S4).

When the digital broadcasting image data and caption information data are separately received from the digital broadcasting server 1-1, the digital broadcasting image data is displayed on the entire screen, and the caption information data is moved and displayed so as not to overlap the EPG information data.

As described above, according to the image processing apparatus and method in the digital broadcasting receiver, caption information of a digital broadcasting image and EPG information do not visually collide with each other. Therefore, a user can stably obtain important information provided by caption.

While the present invention has been described with reference to detailed embodiments thereof, it will be understood by those skilled in the art that various changes in form and detail may be made therein without departing from the scope of the present invention as defined by the following claims. For example, the invention can be applied to other systems, such as a digital multimedia broadcasting (DMB) service.

What is claimed is:

1. An image processing method in a digital broadcasting receiver, comprising:
   determining whether channel data corresponding to a channel comprises caption information;
   in response to a determination that a digital broadcast image of the channel data comprises the caption information, performing a scaled displaying process comprising:
      scaling down digital broadcasting image data received from a digital broadcasting server;
      displaying the scaled down digital broadcasting image data on one side of a screen;
      displaying a caption corresponding to the caption information within the scaled down digital broadcasting image data; and
      displaying electronic program guide (EPG) information data on another side of the screen, and
   in response to a determination that a digital broadcast image of the channel data does not comprise the caption information, alternatively to performing the scaled displaying process, displaying the digital broadcasting image data received from the digital broadcasting server on an entirety of the screen.

2. The image processing method of claim 1, the scaled displaying process further comprising displaying the digital broadcasting image data on an entirety of the screen when the display of the EPG information is finished.

3. The image processing method of claim 1, wherein the caption information comprises at least one of a caption information name, a caption information tag, a caption information length, a caption start time, and a caption end time.

4. A digital broadcasting receiver, comprising:
   an image processor for determining whether channel data corresponding to a changed channel comprises caption information to display with digital broadcasting image data,
   wherein in response to a determination that a digital broadcast image of the channel data comprises the caption information, the image processor scales down the digital broadcasting image data received from a digital broadcasting server, displays the scaled down digital broadcasting image data on one side of a screen, displays a caption corresponding to the caption information within the scaled down digital broadcasting image data, and displays electronic program guide (EPG) information data on another side of the screen, and
   wherein in response to a determination that a digital broadcast image of the channel data does not comprise the caption information, the image processor alternatively to performing the scaled displaying process, displays the digital broadcasting image data received from the digital broadcasting server on an entirety of the screen.

5. The digital broadcasting receiver of claim 4, wherein the image processor comprises:
   a determiner for determining whether the channel data corresponding to the changed channel comprises the caption information; and
   a sub-image processor which, when the determiner determines that the channel data comprises the caption information, scales down the digital broadcasting image data received from the digital broadcasting server, displays the scaled down digital broadcasting image data on one side of the screen, and displays the EPG information data on another side of the screen.

6. The digital broadcasting receiver of claim 5, wherein when the determiner determines that the channel data does not comprise the caption information, the sub-image processor displays the digital broadcasting image data received from the digital broadcasting server on an entirety of the screen.

7. The digital broadcasting receiver of claim 5, wherein when the display of the EPG information is finished, the image processor displays the digital broadcasting image data on an entirety of the screen.

8. The digital broadcasting receiver of claim 5, wherein the caption information comprises at least one of a caption information name, a caption information tag, a caption information length, a caption start time, and a caption end time.

9. A digital broadcasting receiver, comprising: an image processor which, when a digital broadcast image of channel data corresponding to a changed channel separately comprises received caption information, scales down digital broadcasting image data, displays the scaled down digital broadcasting image data on one side of a screen, displays electronic program guide (EPG) information data on one side of digital broadcasting image data received from a digital broadcasting server, moves the caption information to another side of the digital broadcasting image data by scaling down the digital broadcasting image data, so as not to overlap the EPG information data, and displays the caption information and which, when a digital broadcast image of channel data corresponding to the changed channel does not comprise caption information, alternatively to performing the scaled displaying process, displays the digital broadcasting image data received from the digital broadcasting server on an entirety of the screen.

10. An image processing method in a digital image data receiver, comprising:
- determining whether a main digital image data comprises caption information;
- in response to a determination that the main digital image data comprises the caption information, displaying the main digital image data with the caption information without overlapping a sub digital image data by processing an original image of the main digital image data which would otherwise overlap a sub image of the sub digital image data so that a display size of the original image of the main digital image data is scaled down;
- in response to a determination that the main digital image data does not comprise the caption information, alternatively to scaling down the main digital image, displaying the main digital image data with overlapping the sub digital image data by processing an original image data of the main digital image data which would be combined with a sub image of the sub digital image data so that a display size of the original image of the main digital image data is not scaled down; and
- displaying the sub digital image data.

11. The image processing method of claim 10, further comprising displaying the main digital image received from a digital broadcasting server on an entirety of a screen in response to the determination that the main digital image data does not comprise the caption information.

12. The image processing method of claim 10, further comprising scaling down the main digital image received from a digital broadcasting server, displaying the scaled down main digital image on one side of a screen, and displaying an electronic program guide (EPG) on another side of the screen in response to the determination that the main digital image data comprises the caption information.

13. The image processing method of claim 12, further comprising displaying the main digital image on an entirety of the screen when the display of the EPG information is finished.

14. The image processing method of claim 10, wherein the caption information comprises at least one of a caption information name, a caption information tag, a caption information length, a caption start time, and a caption end time.

15. An image processor, comprising:
- a determiner for determining whether a main digital image data comprises caption information; and
- a sub-image processor:
  - to display, in response to a determination that the main digital image data comprises the caption information, the main digital image data with the caption information without overlapping a sub digital image data by processing an original image of the main digital image data which would otherwise overlap a sub image of the sub digital image data so that a display size of the original image of the main digital image data is scaled down,
  - to alternatively display, in response to a determination that the main digital image data does not comprise the caption information, the main digital image data with overlapping the sub digital image data by processing an original image data of the main digital image data which would be combined with a sub image of the sub digital image data so that a display size of the original image of the main digital image data is not scaled down, and
  - to display the sub digital image data.

16. The image processor of claim 15, wherein the determiner is connected to a channel information server and configured to receive the caption information from the channel information server.

17. The image processor of claim 16, wherein the determiner is connected to the channel information server through a cable modem termination system.

18. The image processor of claim 15, wherein the sub-image processor is connected to a digital broadcasting server and configured to receive the main digital image data from the digital broadcasting server.

* * * * *